Figure 1:
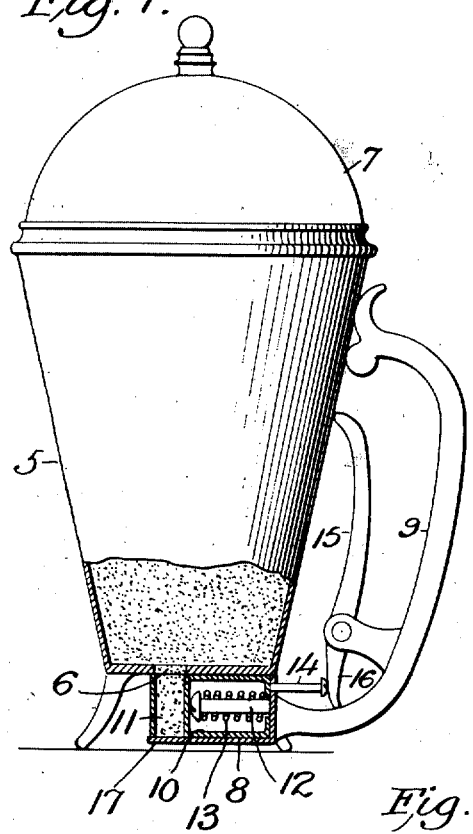

G. A. HENRIQUEZ.
SUGAR BOWL.
APPLICATION FILED JUNE 1, 1910.

1,002,150.

Patented Aug. 29, 1911.

WITNESSES
W. S. McDowell
Chas. E. Richardson

INVENTOR
George A. Henriquez
BY
Victor J. Evans
ATTORNEY

UNITED STATES PATENT OFFICE.

GEORGE A. HENRIQUEZ, OF NEW YORK, N. Y.

SUGAR-BOWL.

1,002,150.  Specification of Letters Patent.  Patented Aug. 29, 1911.

Application filed June 1, 1910. Serial No. 564,373.

*To all whom it may concern:*

Be it known that I, GEORGE A. HENRIQUEZ, a citizen of the United States, residing at New York city, in the county of New York and State of New York, have invented new and useful Improvements in Sugar-Bowls, of which the following is a specification.

Figure 2:
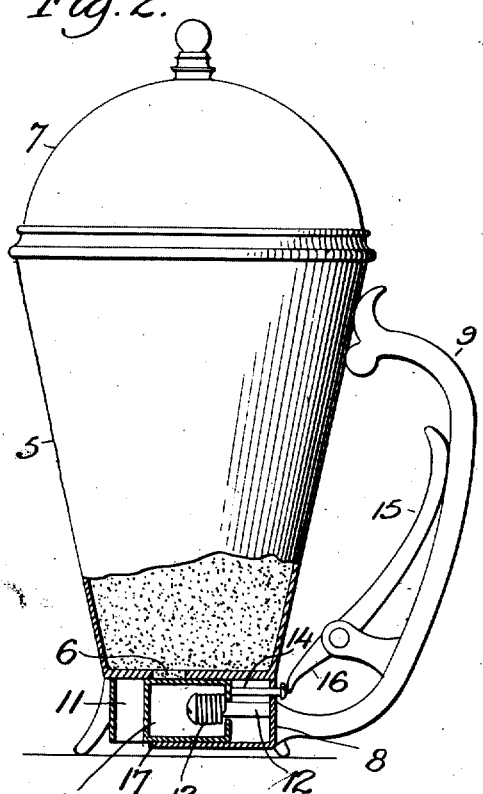
Figure 3:
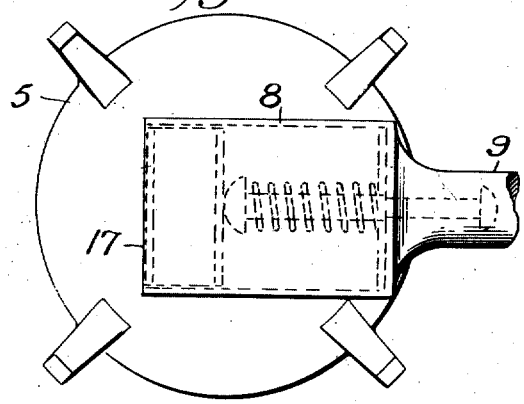

This invention relates to sugar bowls and like utensils where it is necessary to obtain a limited supply of material contained in the device and the invention consists of a receptacle having at its lower end a valve to contain a limited amount of the material which is discharged when the utensil is lifted. These and other objects and details of the invention are more fully described in the following specification, set forth in the claim and illustrated in the drawings, wherein:

Figure 1 is an elevation of a sugar bowl constructed in accordance with this invention and having its lower end in section. Fig. 2 is a similar view showing the position of the operative parts changed. Fig. 3 is an enlarged bottom plan view.

This sugar bowl 5 may be of the ordinary type and made of metal or porcelain and has in its lower side an outlet 6 and a top or cover 7 through which the bowl may be filled with sugar or whatever material it is to contain. On the lower side of the bowl is a box 8 open at one end and communicating with the opening 6. The rear end of this box carries one end of the handle 9 which is also attached to the upper end of the bowl, and in this box 8 is a closely fitting slide 10 having at its front end the compartment 11, open at its upper and lower ends and communicating with the opening 6.

Secured to the rear end of the box 8 is a headed rod 12 and surrounding the same is a spring 13, confined between the head of the rod and the rear of the slide in order to exert a pressure upon the latter and retain it normally in the position shown in Fig. 1. While in this position, the compartment receives a supply of the material within the bowl preparatory to discharging the same when the slide is moved outward, as shown in Fig. 2.

The size of the compartment 11 may be of a predetermined dimension and preferably equal to a teaspoonful of the material to be drawn from the bowl.

The rear end of the slide is provided with a pin 14 while pivoted within the handle 9 is a lever 15, the lower end of which bears against the head of the pin 14 and when the bowl is lifted by the handle, the lever 15 may be swung into the position shown in Fig. 2 so that its lower end 16 presses the pin outward carrying with it the slide 10 and carrying the compartment 11 beyond the range of the bottom 17 of the box so that its contents are free to fall from the compartment while at the same time the slide covers the opening 6 and prevents the discharge of any more of the material.

Without loosening his grip on the handle 9, the party using the device may discharge the contents of the compartment as many times as desired so that the sugar may be furnished to coffee or other beverages by simply holding the bowl over the cup and working the lever 15 to furnish the necessary supply of sugar.

It is obvious that the parts may be otherwise constructed or arranged or otherwise modified without departing from the essential features above described.

What I claim as new and desire to secure by Letters Patent is:

In a sugar bowl, a cup-shaped body having an opening in its bottom, a box secured to the body beneath its bottom and forming a compartment, a sliding box mounted within the compartment and having a delivery passage therein normally registering with the opening in the bottom of the body, a headed pin fixed to the first-named box and projected into the sliding box, a coiled expansion spring surrounding the pin and having its bearing against the head thereof and the sliding box, respectively, for normally holding the sliding box in position, whereby its delivery passage will register with the opening in the bottom of the body, a stud at the rear end of the sliding box, a handle fixed to the bowl, and a lever fulcrumed on the handle and engageable with the stud and adapted for moving the sliding box into position for opening the passage therein and simultaneously closing the opening in the bottom of the bowl.

In testimony whereof I affix my signature in presence of two witnesses.

GEORGE A. HENRIQUEZ.

Witnesses:
 GEO. A. SENIOR,
 JAMES F. DUHAMEL.